(12) United States Patent
Aoyama

(10) Patent No.: US 8,857,774 B2
(45) Date of Patent: Oct. 14, 2014

(54) LEG-PORTION ATTACHMENT STRUCTURE AND IMAGE FORMING APPARATUS PROVIDED THEREWITH

(75) Inventor: Yoshiki Aoyama, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 123 days.

(21) Appl. No.: 12/881,540

(22) Filed: Sep. 14, 2010

(65) Prior Publication Data

US 2011/0073725 A1    Mar. 31, 2011

(30) Foreign Application Priority Data

Sep. 25, 2009   (JP) ................... 2009-220913

(51) Int. Cl.
*A47B 91/00* (2006.01)
*F16M 11/20* (2006.01)
*A47B 97/00* (2006.01)
*B60B 33/00* (2006.01)

(52) U.S. Cl.
CPC ......... *B60B 33/0002* (2013.01); *B60B 33/0073* (2013.01); *B60B 33/0018* (2013.01); *B60B 33/0042* (2013.01); *B60B 33/0057* (2013.01); *B60B 33/0007* (2013.01); *B60B 33/0068* (2013.01); *B60B 33/0049* (2013.01)
USPC .................. 248/188.8; 248/129; 248/346.11; 16/29; 16/18 R; 16/31 A; 16/31 R; 16/30; 16/45; 280/79.11; 312/249.8; 312/351.11; 312/351.12; 108/177; 108/189

(58) Field of Classification Search
USPC ............... 248/188.8, 129, 346.11; 280/79.11; 16/45, 18 R, 31 A, 31 R; 312/249.8, 312/351.11, 351.12; 108/177, 189
See application file for complete search history.

(56) References Cited

U.S. PATENT DOCUMENTS

| 4,187,578 | A | * | 2/1980 | Little ................................. 16/29 |
| 4,927,105 | A | * | 5/1990 | Habermann ............... 248/188.8 |
| 5,524,322 | A | * | 6/1996 | Muehlen ........................... 16/29 |
| 6,290,194 | B1 | * | 9/2001 | Chaconas et al. ............. 248/214 |
| 6,520,460 | B2 | * | 2/2003 | Hallberg et al. ........... 248/188.5 |
| 6,865,774 | B2 | * | 3/2005 | Devine et al. ................. 16/18 R |
| 6,931,692 | B2 | * | 8/2005 | Guttmann et al. ................ 16/45 |
| 7,017,879 | B2 | * | 3/2006 | Wetterberg et al. ...... 248/346.11 |

(Continued)

FOREIGN PATENT DOCUMENTS

| JP | 9-50158 | 2/1997 |
| JP | 2001-158204 | 6/2001 |
| JP | 2001-277808 | 10/2001 |
| JP | 2006-30787 | 2/2006 |

*Primary Examiner* — Terrell McKinnon
*Assistant Examiner* — Christopher Garft
(74) *Attorney, Agent, or Firm* — Smith, Gambrell & Russell LLP

(57) ABSTRACT

A leg-portion attachment structure (100) includes: a support member (110) having a substantially quadrilateral outer periphery and an upper surface on which an apparatus main body (1a) is mounted; two attachment plates (140) provided at two opposite sides on a lower surface of the support member (110). Each of the attachment plates (140) includes caster attachment portions (141) formed respectively on both end sides in a side direction so that casters (130) are firmly attached, first bent portions (142) formed by bending of outer edges in the side direction of the caster attachment portions (141) at predetermined angles, and first coupling portions (143) that are formed by further outward bending of edges of the first bent portions (142) and are firmly attached to the support member (110).

13 Claims, 8 Drawing Sheets

(56) References Cited

U.S. PATENT DOCUMENTS

| | | |
|---|---|---|
| 7,249,738 B2 * | 7/2007 | Kaczorowski ............... 248/129 |
| 7,383,612 B2 * | 6/2008 | Bushey ............................ 16/29 |
| 2001/0042286 A1 * | 11/2001 | Henriott et al. .................. 16/29 |
| 2006/0103092 A1 * | 5/2006 | Strahler et al. ............. 280/79.11 |
| 2007/0228681 A1 * | 10/2007 | Schenker ................... 280/79.11 |
| 2008/0087777 A1 * | 4/2008 | Christian et al. ........... 248/188.8 |
| 2008/0267659 A1 * | 10/2008 | Koyama ........................ 399/107 |
| 2011/0089654 A1 * | 4/2011 | Chen .......................... 280/79.11 |

\* cited by examiner

LEG-PORTION ATTACHMENT STRUCTURE AND IMAGE FORMING APPARATUS PROVIDED THEREWITH

This application is based on Japanese Patent Application No. 2009-220913 filed on Sep. 25, 2009, the contents of which are hereby incorporated by reference.

BACKGROUND OF THE INVENTION

1. Field of the Invention

The present invention relates to a leg-portion attachment structure for movably supporting to-be-mounted main bodies of an image forming apparatus, an electric/electronic apparatus, and the like, and relates to an image forming apparatus provided with the leg-portion attachment structure.

2. Description of Related Art

Some main bodies of image forming apparatuses, electric/electronic apparatuses, and the like are provided with casters. When a heavy image forming apparatus difficult to carry by hand is carried in and out from, for example, an office, or is moved in the office, the image forming apparatus is easily moved by means of the casters.

For example, four casters are respectively provided at four corners of a bottom surface of an apparatus main body of the image forming apparatus or the like. Each of the casters is provided with a shaft portion to which wheels are attached and a flange portion which is attached to the bottom surface of the apparatus main body, the shaft portion being rotatably held by the flange portion. By push of the apparatus main body, the image forming apparatus can be easily moved (Japanese Patent Application Laid-open No. 2006-30787).

Further, the apparatus main body rocks when the image forming apparatus is moved by means of the casters. In order to prevent the rocking, rubber wheels are used as the casters, or the casters are attached to the apparatus main body while springs or rubber blocks are interposed between the apparatus main body and the casters.

As a technology for interposing the springs or the rubber blocks, for example, there has been disclosed a technology for stretchably interposing a compression coil spring between a bracket attachable to an apparatus main body and a flange portion for rotatably holding a caster (Japanese Patent Application Laid-open No. 2001-277808). Further, there has been disclosed another technology for interposing a compression rubber block between a bracket attachable to an apparatus main body and a flange portion for rotatably holding a caster (Japanese Patent Application Laid-open No. 2001-158204). By the above-mentioned technologies, in accordance with a force which is applied to the caster from a floor surface, the compression coil spring shrinks or the compression rubber block is compressed. As a result, rocking of the apparatus main body is suppressed. Further, when the rubber wheels are used as the casters, the rubbers of the wheels are compressed in accordance with a force which is applied to the wheels from the floor surface. As a result, the rocking of the apparatus main body is suppressed.

However, interposition of the coil springs or the rubber blocks between the apparatus main body and the casters as disclosed in the above-mentioned technologies has led to problems of upsizing and increase in cost of the apparatus. Further, load of the apparatus main body is much larger in the case of an image forming apparatus such as a large copier, and hence a high impact force acts on the casters when the apparatus main body starts to be moved. In order to absorb the impact force and support the load of the apparatus main body, it is necessary to use a rubber material excellent in load bearing properties and having a high elastic coefficient for the rubber wheels, which has led to such a problem that the wheels are expensive.

SUMMARY OF THE INVENTION

The present invention has been made to solve the problems as described above, and it is an object of the present invention to provide a leg-portion attachment structure and an image forming apparatus provided therewith, the leg-portion attachment structure being capable of reliably supporting a load of an apparatus main body without breakage of casters, stably moving the apparatus main body while suppressing rocking thereof, and further, suppressing upsizing and increase in cost of the apparatus.

In order to achieve the above-mentioned object, a leg-portion attachment structure according to the present invention, includes: a plurality of casters movable on a floor surface; a support member having a substantially quadrilateral outer periphery and an upper surface on which an apparatus main body is mounted; and an attachment plate provided at least at one of two opposite sides on a lower surface of the support member, the attachment plate including a caster attachment portion formed on each end side in a side direction so that one of the plurality of casters is firmly attached, a first bent portion formed by bending of an outer edge in the side direction of the caster attachment portion at a predetermined angle, and a first coupling portion that is formed by further outward bending of an edge of the first bent portion and is firmly attached to the support member.

With this configuration, the apparatus main body is supported by the support member, and the support member is moved on the floor surface by means of the plurality of casters. When the apparatus main body having remained stationary starts to be moved in the side direction, a force in a horizontal direction is applied to the plurality of casters in proportion to the load of the apparatus main body. The force in the horizontal direction causes an impact force to act on the plurality of casters, the impact force acting on the plurality of casters being transmitted to the attachment plate. The first bent portion of the attachment plate is bent at the predetermined angle with respect to the side direction, and hence is elastically deformed in accordance with the force in the horizontal direction. As a result, the impact on the plurality of casters is reduced. Accordingly, the apparatus main body is allowed to be stably moved without breakage of the plurality of casters. Further, it is unnecessary to interpose coil springs or rubber blocks, and hence it is possible to suppress upsizing and increase in cost of the apparatus.

Further, in the above-mentioned leg-portion attachment structure, the attachment plate includes a second bent portion formed by bending of an inner edge in the side direction of the caster attachment portion at a predetermined angle.

With this configuration, when the apparatus main body having remained stationary starts to be moved in the side direction, the force in the horizontal direction is applied to the plurality of casters in proportion to the load of the apparatus main body. The force in the horizontal direction causes the impact force to act on the plurality of casters, the impact force acting on the plurality of casters being transmitted to the attachment plate. The second bent portion of the attachment plate is bent at the predetermined angle with respect to a caster moving direction, and hence is elastically deformed in accordance with the force in the horizontal direction, with the result of reducing the impact on the plurality of casters together with the first bent portion. Accordingly, the apparatus main body is allowed to be stably moved without breakage of the plurality of casters. Further, it is unnecessary to interpose coil springs or rubber blocks, and hence it is possible to suppress upsizing and increase in cost of the apparatus.

Further, in the above-mentioned leg-portion attachment structure, the first bent portion and the second bent portion are respectively formed by bending of edges of the caster attachment portion toward the floor surface.

With this configuration, positions of the caster attachment portions are more separated from the floor surface than the first coupling portions attached to the support member. Accordingly, even when the plurality of casters are attached to the caster attachment portions, it is possible to reduce a height of the leg-portion attachment structure, and hence possible to suppress upsizing of the apparatus.

Further, in the above-mentioned leg-portion attachment structure, the second bent portion is formed by being bent at an obtuse angle with respect to the caster attachment portion.

With this configuration, when the force in the horizontal direction is applied to the plurality of casters in proportion to the load of the apparatus main body, each of the second bent portions bent at obtuse angles is elastically deformed from a shape forming an obtuse angle to a shape forming a right angle. As a result, impact on the casters is reduced. Accordingly, the apparatus main body is allowed to be stably moved without breakage of the plurality of casters. Further, it is unnecessary to interpose coil springs or rubber blocks, and hence possible to suppress upsizing and increase in cost of the apparatus.

Further, in the above-mentioned leg-portion attachment structure, the first bent portion is formed by being bent at a right angle with respect to the caster attachment portion.

With this configuration, when the force in the horizontal direction is applied to the plurality of casters in proportion to the load of the apparatus main body, each of the first bent portions bent at right angles is elastically deformed from a shape forming a right angle to a shape forming an obtuse angle or a sharp angle. As a result, impact on the casters is reduced. Accordingly, the apparatus main body is allowed to be stably moved without breakage of the plurality of casters. Further, it is unnecessary to interpose coil springs or rubber blocks, and hence possible to suppress upsizing and increase in cost of the apparatus.

Further, in the above-mentioned leg-portion attachment structure, the attachment plate includes a third bent portion formed by bending of an inner edge in a direction orthogonal to the side direction of the caster attachment portion at a predetermined angle, and a third coupling portion that is formed by further inward bending of an edge of the third bent portion and is firmly attached to the support member; and an outer edge in the direction orthogonal to the side direction of the caster attachment portion constitutes a free end free from being firmly attached to the support member.

With this configuration, the plurality of casters are exposed to a perpendicular force which resists the load of the apparatus main body and is applied from the floor surface when the apparatus main body remains stationary. In addition, the plurality of casters are exposed to vibration and impact applied from the floor surface in proportion to the load of the apparatus main body at the time of movement thereof. The vibration and impact are transmitted to the attachment plate. However, in the attachment plate, the outer sides of the caster attachment portions constitute the free end. Thus, the attachment plate is elastically deformed in accordance with the perpendicular force and forces derived from the vibration and impact, and hence the vibration and impact on the casters are reduced. Accordingly, without breakage of the plurality of casters, it is possible to reliably support the load of the apparatus main body, and stably move the apparatus main body while suppressing the vibration and impact thereon.

Further, in the above-mentioned leg-portion attachment structure, the third bent portion is formed by being bent by the same amount as that of the first bent portion.

With this configuration, the third coupling portion and the first coupling portion are equal to each other in height, and hence the attachment plate can be easily attached to the support member.

Further, in the above-mentioned leg-portion attachment structure, the support member includes four pipe members attached so that four sides of a quadrangle are formed, and a flat plate firmly attached to the four pipe members; and the attachment plate is firmly attached to the four pipe members.

With this configuration, the support member becomes more rigid and hence the apparatus main body can be stably supported.

Further, in the above-mentioned leg-portion attachment structure, the attachment plate is formed of an elastic steel plate.

Further, in the above-mentioned leg-portion attachment structure, the first bent portion of the attachment plate is provided with a groove extending in a vertical direction.

With this configuration, even when an apparatus main body having a larger load is mounted, the load can be supported, for example, by the attachment plate having a larger thickness, and the first bent portion is elastically deformed more easily by being provided with the groove extending in the vertical direction. As a result, the impact and vibration on the plurality of casters are reduced.

Further, in the above-mentioned leg-portion attachment structure, the second bent portion of the attachment plate is provided with a groove extending in a vertical direction.

With this configuration, even when an apparatus main body having a larger load is mounted, the load can be supported, for example, by the attachment plate having a larger thickness, and the second bent portion is elastically deformed more easily by being provided with the groove extending in the vertical direction. As a result, the impact and vibration on the plurality of casters are reduced.

Further, in the above-mentioned leg-portion attachment structure, the attachment plate includes a connecting portion formed between the second bent portions, a third bent portion formed by bending of an inner edge in a direction orthogonal to a side direction of the connecting portion, and a third coupling portion that is formed by further inward bending of an edge of the third bent portion and is firmly attached to the support member.

With this configuration, the third coupling portion and each of the caster attachment portions are separated from each other. Thus, even when the perpendicular force resisting the load of the apparatus main body is applied from the floor surface to the plurality of casters, the caster attachment portions are elastically deformed upward more easily in accordance with the perpendicular force from the floor surface. The elastic deformation reduces the load applied to the plurality of casters.

Further, in the above-mentioned leg-portion attachment structure, an outer edge in the direction orthogonal to the side direction of the connecting portion constitutes a free end free from being firmly attached to the support member.

With this configuration, the plurality of casters are exposed to the perpendicular force which resists the load of the apparatus main body and is applied from the floor surface when the apparatus main body remains stationary. In addition, the plurality of casters are exposed to vibration and impact applied from the floor surface in proportion to the load of the apparatus main body at the time of movement thereof. The vibration and impact are transmitted to the attachment plate. However, in the attachment plate, the outer side of the connecting portion constitutes the free end. Thus, the attachment plate is elastically deformed in accordance with the perpendicular force and forces derived from the vibration and impact, and hence the vibration and impact on the casters are reduced. Accordingly, without breakage of the plurality of casters, it is possible to reliably support the load of the apparatus main body, and stably move the apparatus main body while suppressing the vibration and impact thereon.

The present invention provides an image forming apparatus mounted to the above-mentioned leg-portion attachment structure.

With the configuration, the present invention provides an image forming apparatus provided with a leg-portion attachment structure, the leg-portion attachment structure being capable of reliably supporting a load of an apparatus main body without breakage of casters, stably moving the apparatus main body while suppressing rocking thereof, and further, suppressing upsizing and increase in cost of the apparatus.

DETAILED DESCRIPTION OF PREFERRED EMBODIMENTS

In the following, although description is made of embodiments of the present invention with reference to the drawings, the present invention is not limited to those embodiments. Further, use of the present invention or terms used herein also should not be construed restrictively.

Figure 1:
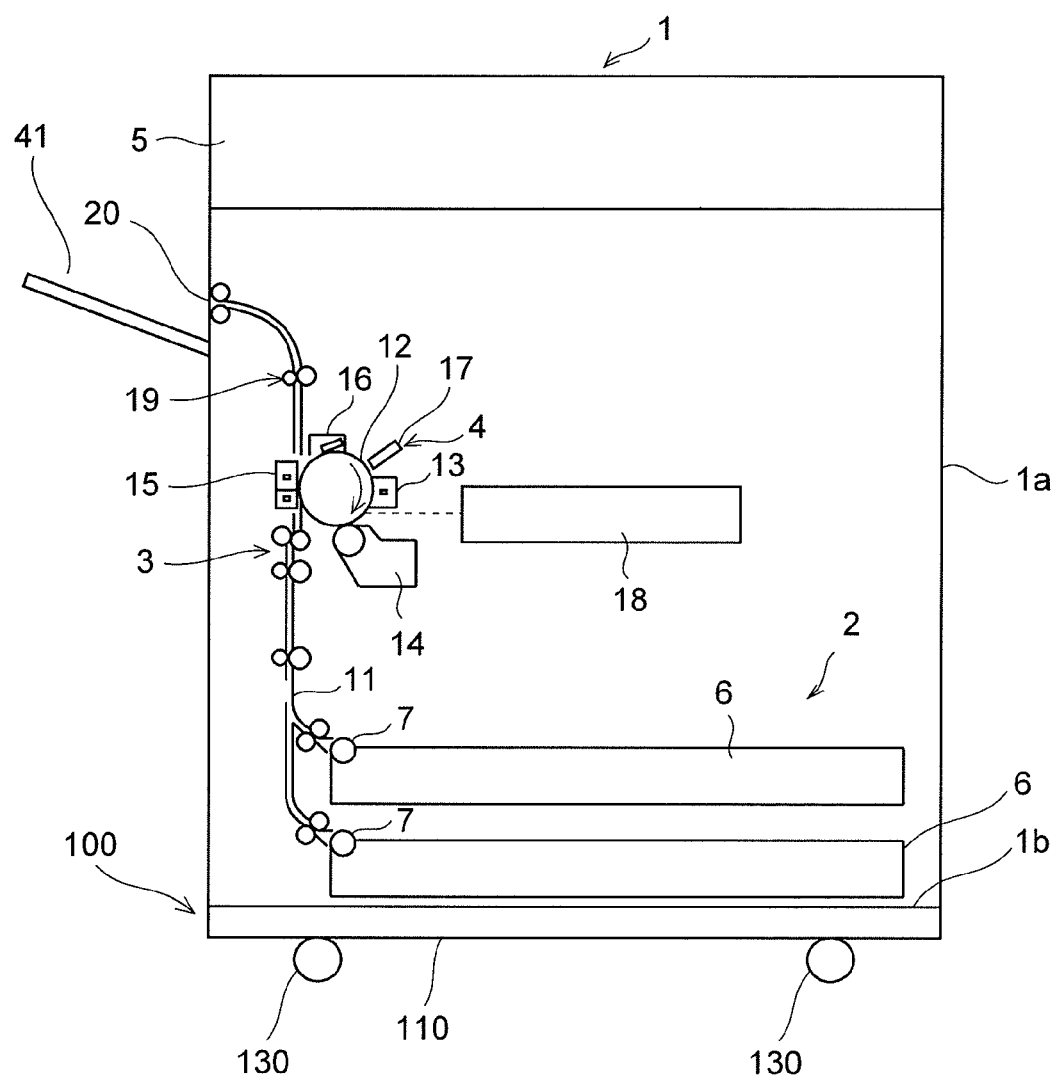
FIG. 1 illustrates a schematic configuration of an image forming apparatus provided with a leg-portion attachment structure according to embodiments of the present invention.

FIG. 1 illustrates a schematic configuration of an image forming apparatus 1 according to the embodiments of the present invention. The image forming apparatus 1 is a digital copier, and includes a sheet feeding portion 2 arranged in a lower portion of an apparatus main body 1a, a sheet conveying portion 3 arranged upward on the left of the sheet feeding portion 2, an image forming portion 4 provided on the right of the sheet conveying portion 3, and an image reading portion 5 arranged in an upper portion of the apparatus main body 1a.

The sheet feeding portion 2 is provided with a plurality of sheet feeding cassettes 6 in which sheets are housed, and the sheets are sent out, to the sheet conveying portion 3, one by one from selected one of the sheet feeding cassettes 6 due to rotation of corresponding one of sheet feeding rollers 7.

The sheet sent out from the sheet feeding cassette 6 is conveyed to the image forming portion 4 through the sheet conveying portion 3. The image forming portion 4 forms a toner image onto the sheet by an electrophotographic process, and includes a photosensitive member 12 pivotally supported in a rotatable manner in the arrow direction to serve as an image carrier, and the following provided around the photosensitive member 12 along a rotational direction thereof: a charging unit 13, a developing unit 14, a transfer unit 15, a cleaning unit 16, and a neutralizing unit 17.

The charging unit 13 imparts a predetermined electrical potential to a surface of the photosensitive member 12 so that the surface of the photosensitive member 12 is uniformly charged. Then, an electrostatic image is formed on the photosensitive member 12 by a laser beam from a laser scanning unit 18 on the basis of image data of an original document read by the image reading portion 5. Next, toner is supplied by the developing unit 14 onto the photosensitive member 12, and a toner image is formed on the surface of the photosensitive member 12. The toner image is transferred by the transfer unit 15 onto the sheet supplied between the photosensitive member 12 and the transfer unit 15.

The sheet having the toner image transferred thereon is conveyed from the image forming portion 4 to a fixing roller pair 19. The fixing roller pair 19 is constituted by a heating roller and a pressing roller pressed against the heating roller. The sheet is heated while being nipped between the heating roller and the pressing roller, and thus the toner image is fixed onto the sheet. The sheet having the toner image fixed thereon is delivered onto a sheet delivering portion 41 by a delivery roller pair 20.

Residual toner on the surface of the photosensitive member 12 is removed by the cleaning unit 16, and residual charge on the surface of the photosensitive member 12 is removed by the neutralizing unit 17. Then, preparation is made for the next image formation.

A leg-portion attachment structure 100 is provided on a bottom surface 1b of the apparatus main body 1a. The leg-portion attachment structure 100 includes a support member 110 and casters 130, and reduces a force of pressing the apparatus main body 1a when the image forming apparatus 1 is moved. As a result, the image forming apparatus 1 is smoothly moved.

(First Embodiment)

Figure 2:
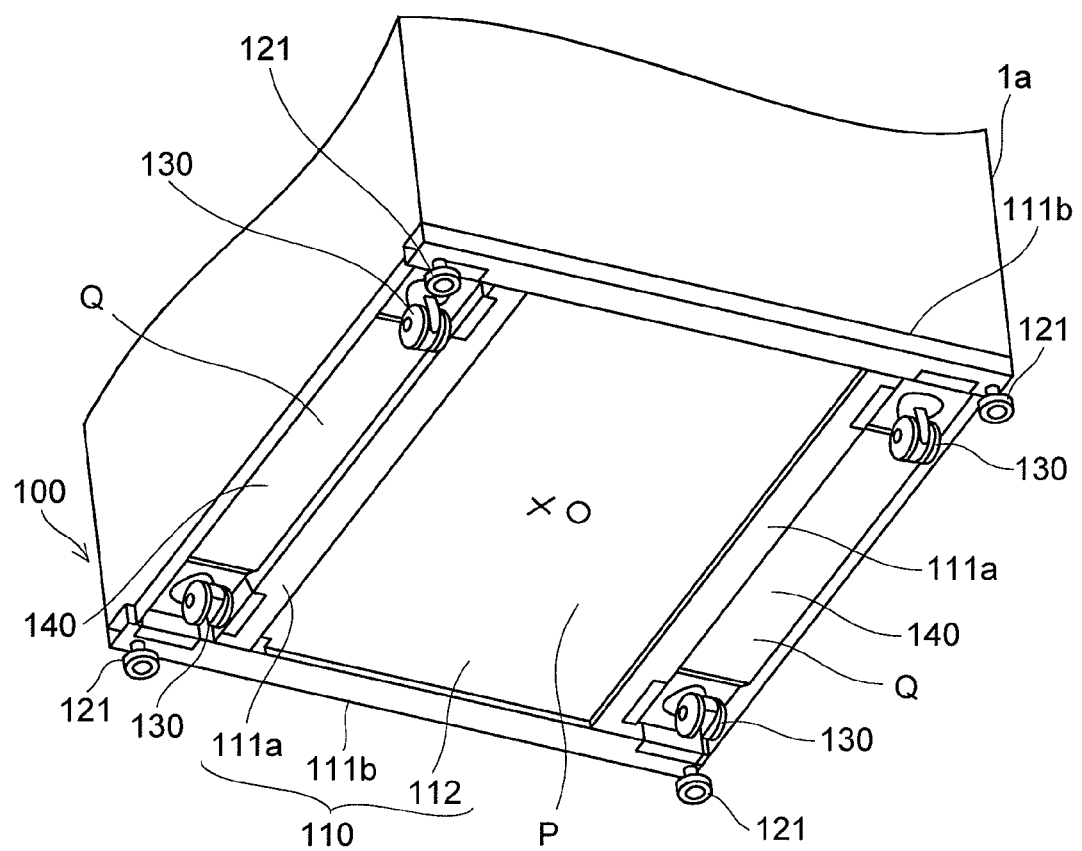
FIG. 2 is a perspective view of a leg-portion attachment structure according to a first embodiment of the present invention.

FIG. 2 is a perspective view from a floor surface side, illustrating the leg-portion attachment structure 100 according to a first embodiment of the present invention.

The leg-portion attachment structure 100 includes the support member 110, attachment plates 140, the casters 130, and fixing legs 121. The apparatus main body 1a of the image forming apparatus 1 is mounted onto an upper surface of the support member 110. The casters 130 and the fixing legs 121 are respectively arranged at four corners of the lower surface of the support member 110, the casters 130 being provided rotatably with respect to the support member 110, the fixing legs 121 being provided in a manner of holding the apparatus main body 1a with respect to a floor surface at the time of installation. Note that, in this embodiment, description is made on the premise that the floor surface side of the leg-portion attachment structure 100 is referred to as "lower surface" or "lower side", and an apparatus main body 1a side thereof is referred to as "upper surface" or "upper side".

Further, description is made on the premise that a side distant from a central portion (point O of FIG. 2) of the leg-portion attachment structure 100 on a horizontal plane is referred to as "outer side", and a side on the central portion (point O of FIG. 2) is referred to as "inner side".

The support member 110 includes two angular pipes 111a made of steel, two angular pipes 111b made of steel, and a bottom plate 112 formed of a steel plate.

Each of the pairs of pipes 111a and 111b is arranged in a shape of "II" in roman numeral, and there are formed a region P constituted by a quadrilateral space surrounded by the pipes 111a and 111b, and regions Q respectively constituted by spaces surrounded by the pipe 111a and the pipes 111b on three sides and opened on one side. The regions Q each have a rectangular shape and are respectively formed along two opposite sides of the quadrilateral region P. The pipes 111a and 111b are firmly attached to each other by welding or with screws.

The bottom plate 112 includes a flat plate portion exhibiting a quadrilateral shape corresponding to the region P defined by the pipes 111a and 111b, and bent portions formed by downward bending of four sides of the flat plate portion. The bottom plate 112 is firmly attached to the pipes 111a and 111b by welding or with screws under a state of being fitted to the region P. The apparatus main body 1a is mounted to upper surfaces of the pipes 111a and 111b and of the bottom plate 112. Note that, it is possible to use, as the bottom plate 112, a flat plate covering the upper surfaces of the pipes 111a and 111b, firmly attach the bottom plate 112 to the upper surfaces of the pipes 111a and 111b, and mount the apparatus main body 1a on the bottom plate 112.

Each of the attachment plates 140 is formed of a metal plate into a rectangular shape, with both shorter-side end sides thereof being bent downward and one longer-side end portion being bent downward. The attachment plates 140 are provided along the two opposite sides of the quadrilateral support member 110, in other words, respectively arranged in the regions Q of the support member 110. The attachment plates 140 are firmly attached by welding or with screws to lower surfaces of the pipes 111a and 111b through intermediation of the bent end portions of the attachment plates 140.

The casters 130 are attached on both the shorter-side end sides of each of the attachment plates 140. When the image forming apparatus 1 is pushed/drawn, the casters 130 are rotated and the image forming apparatus 1 is moved in a pushing/drawing direction.

The fixing legs 121 are arranged respectively on both end portions of each of the pipes 111b, and are movable in the vertical direction with respect to the support member 110. In order to move the image forming apparatus 1, the fixing legs 121 are moved upward so that the casters 130 land on the floor surface. Meanwhile, in order to install the image forming apparatus 1, the fixing legs 121 are moved downward so that the casters 130 do not land on the floor surface and that the fixing legs 121 support the image forming apparatus 1.

Figure 3:
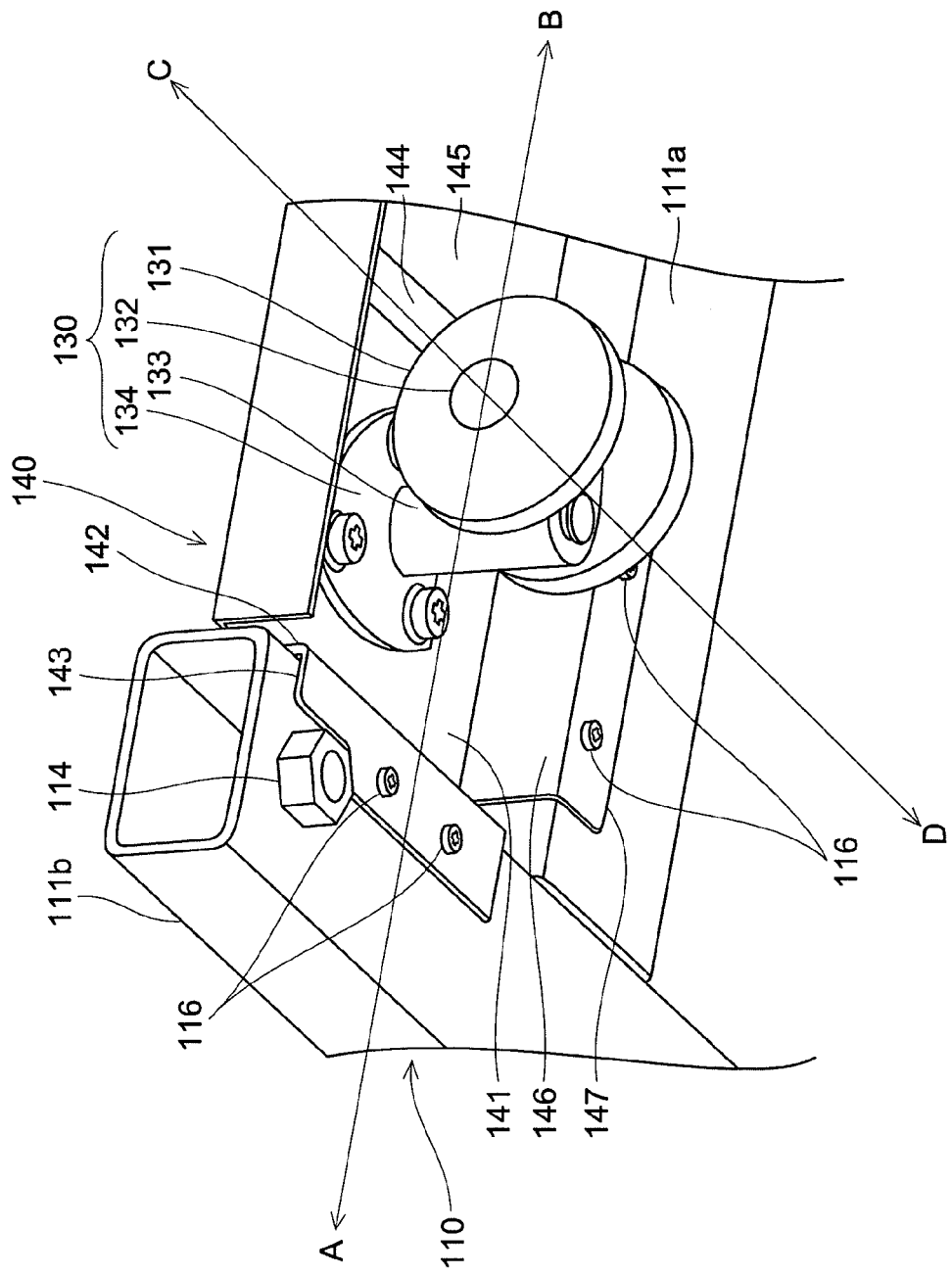
FIG. 3 is a perspective view of a main portion of an attachment plate of the leg-portion attachment structure according to the first embodiment of the present invention.
Figure 4:
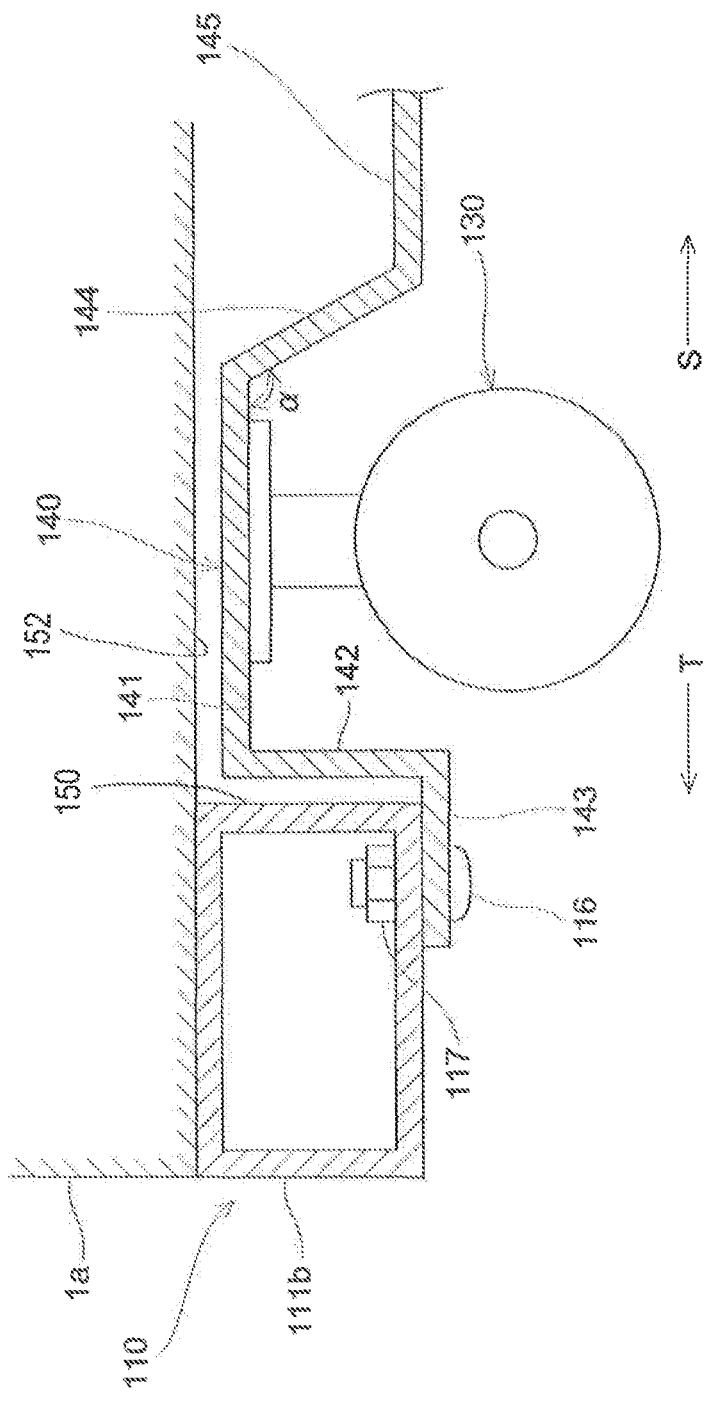
FIG. 4 is a schematic partial sectional view taken along a side direction of the attachment plate according to the first embodiment of the present invention.
Figure 5:
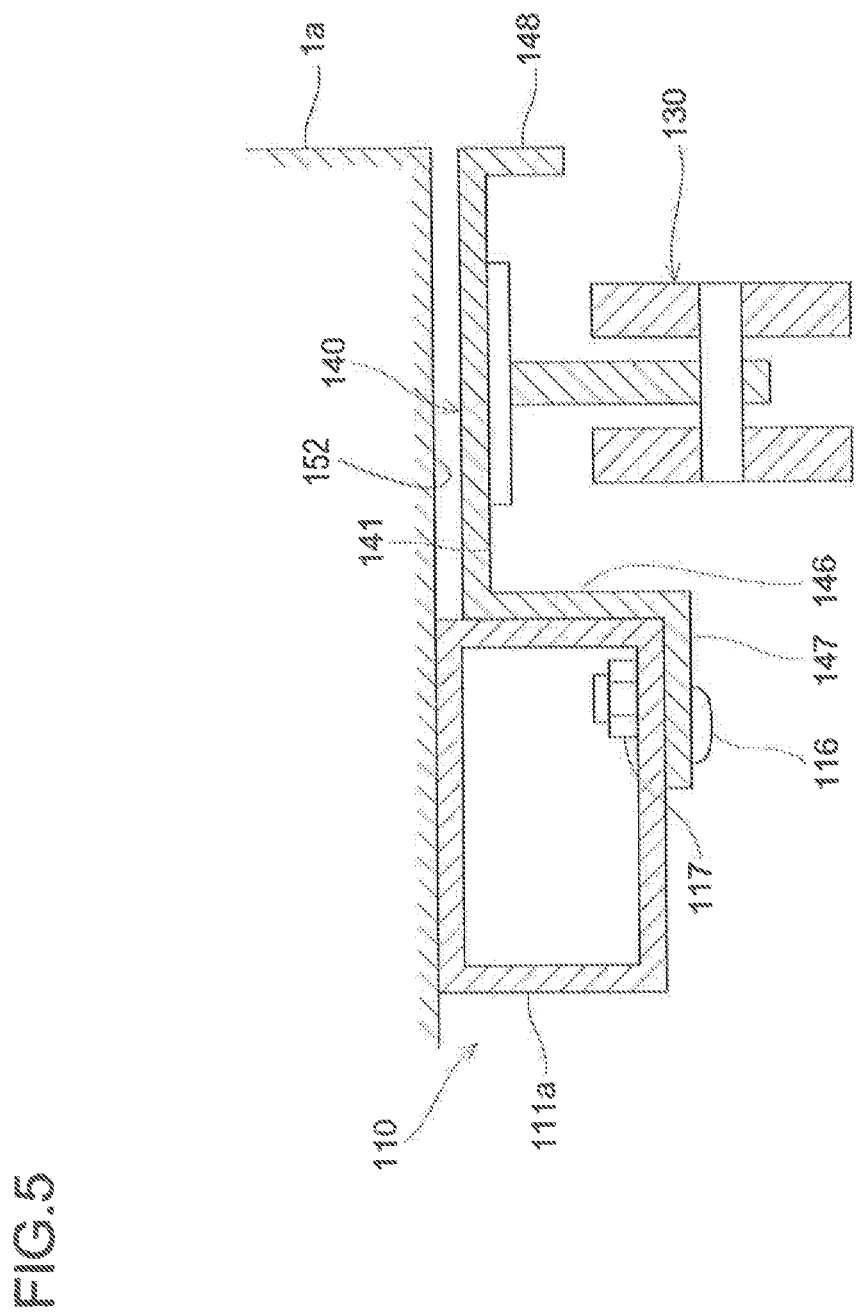
FIG. 5 is a schematic partial sectional view taken along a direction orthogonal to the side direction of the attachment plate according to the first embodiment of the present invention.

Next, detailed description is made of the attachment plate 140 with reference to FIGS. 3 to 5. FIG. 3 is a perspective view of one end side of the attachment plate. FIG. 4 is a schematic sectional view taken along the direction of the arrows A-B of FIG. 3. FIG. 5 is a schematic sectional view taken along the direction of the arrows C-D of FIG. 3. Note that, although FIGS. 3 to 5 illustrate only the one end side of one of the attachment plates 140, the same configuration as that illustrated in FIGS. 3 to 5 is provided on another end side of each of the attachment plates 140. Further, FIG. 3 illustrates a state in which the fixing leg 121 is detached from an attachment nut 114. In addition, the direction of the arrow A and the direction of the arrow C correspond to the above-mentioned "outer side", and the direction of the arrow B and the direction of the arrow D correspond to the above-mentioned "inner side".

As illustrated in FIG. 3, the attachment plate 140 has a lower surface on which a caster attachment portion 141 is provided so that the caster 130 is attached thereto.

Further, the attachment plate 140 includes a first bent portion 142 formed by downward bending at a right angle of an outer edge in a side direction of the caster attachment portion 141 (direction of the arrows A-B of FIG. 3), and a first coupling portion 143 formed by further outward bending at a right angle of a lower edge of the first bent portion 142.

Still further, the attachment plate 140 includes a second bent portion 144 formed by downward bending of an inner edge in the side direction of the caster attachment portion 141 (direction of the arrows A-B of FIG. 3) at an obtuse angle (refer also to FIG. 4, angle α=153°) with respect to the caster attachment portion 141. Note that, the second bent portion 144 may be formed by bending of the caster attachment portion 141 at a right angle.

A connecting portion 145 is formed on an inner edge in a side direction of the second bent portion 144. The connecting portion 145 connects the two caster attachment portions 141 to each other. While not shown, similarly to the above description, another second bent portion 144, another caster attachment portion 141, another first coupling portion 143, and a third coupling portion 147 described later are formed on the other side of the connecting portion 145 illustrated in FIG. 3.

In addition, the attachment plate 140 includes a third bent portion 146 formed by downward bending at a right angle of an inner edge in a direction orthogonal to the side direction of the caster attachment portion 141 (direction of the arrows C-D of FIG. 3), and the third coupling portion 147 formed by further inward bending at a right angle of a lower edge of the third bent portion 146. The third bent portion 146 is bent by the same amount as that of the first bent portion 142.

The caster 130 includes wheels 131, a rotary shaft 132 provided integrally with the wheels 131, and a flange portion 133 for rotatably holding the rotary shaft 132. An attachment base 134 provided above the flange portion 133 rotatably holds the flange portion 133, and is firmly attached to the caster attachment portion 141 of the attachment plate 140 with screws. The wheels 131 are molded integrally with the rotary shaft 132 with use of a hard resin such as a polyamide resin.

The first coupling portion 143 of the attachment plate 140 is firmly attached to the lower surface of the pipe 111b with two pairs of screws 116 and 117 (refer to FIG. 4) so that there is a gap 150 between the first bent portion 142 and pipe 11b and a gap 152 between attachment plate 140 and the lower surface of apparatus main body 1a. Further, the third coupling portion 147 is firmly attached to the lower surface of the pipe 111a with two pairs of screws 116 and the nuts 117 (refer to FIG. 5) so that gap 152 is formed. Instead of screws and the nuts, the first coupling portion 143 and the third coupling portion 147 may be firmly attached respectively to the lower surfaces of the pipes 111b and 111a by spot welding, arc welding, laser welding, or the like.

When the attachment plate 140 is firmly attached to the pipes 111a and 111b in this manner, load of the apparatus main body 1a mounted to the pipes 111a and 111b (support member 110) is supported by the four casters 130 through intermediation of the attachment plates 140.

A material and thicknesses of the attachment plates 140 are set so that the attachment plates 140 are not plastically deformed by the load of the apparatus main body 1a but merely elastically deformed so as to support the load of the apparatus main body 1a.

The following are suitable to the material of the attachment plates 140: a cold-rolled or hot-rolled steel plate, an electro-galvanized or hot-dip galvanized steel plate, a high-tensile steel plate, a stainless steel plate, an aluminum alloy plate (A5052P), and a copper alloy plate (C5210P). Among them, steel plates having high elasticity are especially preferred.

The thicknesses of the attachment plates 140 are appropriately set in accordance with the load of the apparatus main body 1a and the selected material of the attachment plates 140.

In this context, as illustrated in FIG. 4, when the apparatus main body 1a is supported by the support member 110 including the pipes 111b and the pipes 111a (refer to FIG. 5) and the apparatus main body 1a is moved in the direction of the arrow T, a force in a horizontal direction (direction of the arrow S) opposite to a caster movement direction T is applied to the caster 130 at the time of starting movement in proportion to the load of the apparatus main body 1a. The force in the horizontal direction acts on the caster 130 as an impact force, the impact force acting on the caster 130 being transmitted to the attachment plate 140. The first bent portion 142 and the second bent portion 144 of the attachment plate 140 are bent at predetermined angles with respect to the side direction (direction of the arrows A-B of FIG. 3). Thus, in accordance with the force in the horizontal direction (direction of the arrow S), the first bent portion 142 is elastically deformed in the direction of the arrow S, and the second bent portion 144 is elastically deformed from a shape forming an obtuse angle to a shape forming a right angle. The elastic deformation reduces the impact acting on the caster 130 at the time of starting movement. When a movement speed of the apparatus main body 1a becomes constant, each of the first bent portion 142 and the second bent portion 144 is restored to an original shape.

Then, when the moving apparatus main body 1a is stopped, a force in another horizontal direction (direction of the arrow T) opposite to the above-mentioned one is applied to the caster 130 in proportion to the load of the apparatus main body 1a. The force in the another horizontal direction causes the impact force to act on the caster 130, the impact force acting on the caster 130 being transmitted to the attachment plate 140. The first bent portion 142 and the second bent portion 144 of the attachment plate 140 are bent at predetermined angles with respect to the side direction (direction of the arrows A-B of FIG. 3). Thus, in accordance with the force in the another horizontal direction (direction of the arrow T), the first bent portion 142 is elastically deformed in the direction of the arrow T and gap 150, and the second bent portion 144 is elastically deformed into a shape forming a more obtuse angle. The elastic deformation reduces the impact acting on the caster 130 at the time of stopping the apparatus main body 1a. When the apparatus main body 1a is stopped, each of the first bent portion 142 and the second bent portion 144 is restored to an original shape.

Note that, when the apparatus main body 1a is moved in the direction of the arrow S, each of the first bent portion 142 and the second bent portion 144 is elastically deformed in a direction opposite to that in the case where the apparatus main body 1a is moved in the direction of the arrow T. The elastic deformation reduces the impact acting on the caster 130 similarly to the case where the apparatus main body 1a is moved in the direction of the arrow T.

Further, in FIG. 5, when the apparatus main body 1a remains stationary, a perpendicular force resisting the load of the apparatus main body 1a is applied from the floor surface to the caster 130. However, the third coupling portion 147 of the attachment plate 140 is firmly attached to the pipe 111a, and meanwhile, outer sides of the caster attachment portion 141 and of the connecting portion 145 (refer to FIG. 3) constitute a free end 148 free from being firmly attached to the pipe 111a. Thus, in accordance with the perpendicular force from the floor surface, the caster attachment portion 141 and the connecting portion 145 are elastically deformed upward. The elastic deformation reduces the load applied to the caster 130 when the apparatus main body 1a remains stationary.

Further, when the apparatus main body 1a is moved, the caster 130 is exposed to vibration and impact in accordance with the load of the apparatus main body 1a owing to roughness and the like of the floor. However, as described above, the outer sides of the caster attachment portion 141 and of the connecting portion 145 (refer to FIG. 3) constitute the free end 148, and hence the caster attachment portion 141 and the connecting portion 145 are elastically deformed upward or downward in accordance with the vibration and impact from the floor surface. The elastic deformation reduces the vibration and impact on the caster 130.

According to the above-mentioned first embodiment, the leg-portion attachment structure 100 is moved on the floor surface by means of the plurality of casters 130 provided on the bottom surface 1b of the apparatus main body 1a. Further, the leg-portion attachment structure 100 includes the support member 110 having a substantially quadrilateral outer periphery and the upper surface on which the apparatus main body 1a is mounted, and the two attachment plates 140 provided on the lower surface of the two opposite sides of the support member 110. Each of the attachment plates 140 includes the caster attachment portions 141 formed respectively on both the end sides in the above-mentioned side direction so that the casters 130 are firmly attached, the first bent portions 142 formed by bending of the outer edges in the above-mentioned side direction of the caster attachment portions 141 at predetermined angles, and the first coupling portions 143 formed by further outward bending of the edges of the first bent portions 142 and firmly attached to the support member 110.

With this configuration, the apparatus main body 1a is supported by the support member 110, and the support member 110 is moved on the floor surface by means of the casters 130. When the apparatus main body 1a having remained stationary starts to be moved in the side direction, the force in the horizontal direction is applied to the casters 130 in proportion to the load of the apparatus main body 1a. The force in the horizontal direction causes the impact force to act on the casters 130, the impact force acting on the casters 130 being transmitted to the attachment plates 140. The first bent portion 142 of each of the attachment plates 140 is bent at a predetermined angle with respect to the side direction, and hence is elastically deformed in accordance with the force in the horizontal direction. As a result, the impact acting on the casters 130 is reduced. Accordingly, the apparatus main body 1a is allowed to be stably moved without breakage of the casters 130. Further, it is unnecessary to interpose coil springs or rubber blocks, and hence possible to suppress upsizing and increase in cost of the apparatus. Further, it is unnecessary to use rubber wheels as the casters 130, and hence it is possible to mold the wheels integrally with the rotary shafts with use of a hard resin material, which leads to cost reduction.

Further, according to the above-mentioned first embodiment, each of the attachment plates 140 includes the second bent portion 144 formed by bending of the inner edge in the side direction of the caster attachment portion 141 at a predetermined angle with respect to the caster moving direction.

With this configuration, when the apparatus main body 1a having remained stationary starts to be moved in the side direction, the force in the horizontal direction is applied to the casters 130 in proportion to the load of the apparatus main body 1a. The force in the horizontal direction causes the impact force to act on the casters 130, the impact force on the casters 130 being transmitted to the attachment plates 140. The second bent portion 144 of each of the attachment plates 140 is bent at a predetermined angle with respect to the side direction, and hence is elastically deformed in accordance with the force in the horizontal direction. As a result, the impact acting on the casters 130 is reduced. Accordingly, the apparatus main body 1a is allowed to be stably moved without breakage of the casters 130. Further, it is unnecessary to interpose coil springs or rubber blocks, and hence it is possible to suppress upsizing and increase in cost of the apparatus.

Still further, according to the above-mentioned first embodiment, the first bent portion 142 and the second bent portion 144 are formed by bending of the edges of the caster attachment portions 141 toward the floor surface. With this configuration, positions of the caster attachment portions 141 are more separated from the floor surface than the first coupling portions 143 attached to the support member 110. Accordingly, even when the casters 130 are attached to the caster attachment portions 141, it is possible to reduce a height of the leg-portion attachment structure 100, and hence possible to suppress upsizing of the apparatus.

Yet further, according to the above-mentioned first embodiment, the second bent portions 144 are bent at obtuse angles with respect to the caster attachment portions 141. With this configuration, when the force in the horizontal direction is applied to the casters 130 in proportion to the load of the apparatus main body 1a, each of the second bent portions 144 bent at obtuse angles is elastically deformed from a shape forming an obtuse angle to a shape forming a right angle, or elastically deformed into a shape forming a more obtuse angle. As a result, the impact on the casters 130 is reduced. Accordingly, the apparatus main body 1a is allowed to be stably moved without breakage of the casters 130. Further, it is unnecessary to interpose coil springs or rubber blocks, and hence it is possible to suppress upsizing and increase in cost of the apparatus.

Yet further, according to the above-mentioned first embodiment, each of the attachment plates 140 includes the third bent portion 146 formed by bending of the inner edge in the direction orthogonal to the side direction of the caster attachment portion 141 at a predetermined angle, and the third coupling portion 147 formed by further inward bending of the edge of the third bent portion 146 and firmly attached to the support member 110, the third coupling portion 147 being formed by being bent by the same amount as that of the first bent portion 142. With this configuration, the third coupling portion 147 and the first coupling portion 143 are equal to each other in height, and hence the attachment plates 140 can be easily attached to the support member 110.

(Second Embodiment)

Figure 6:
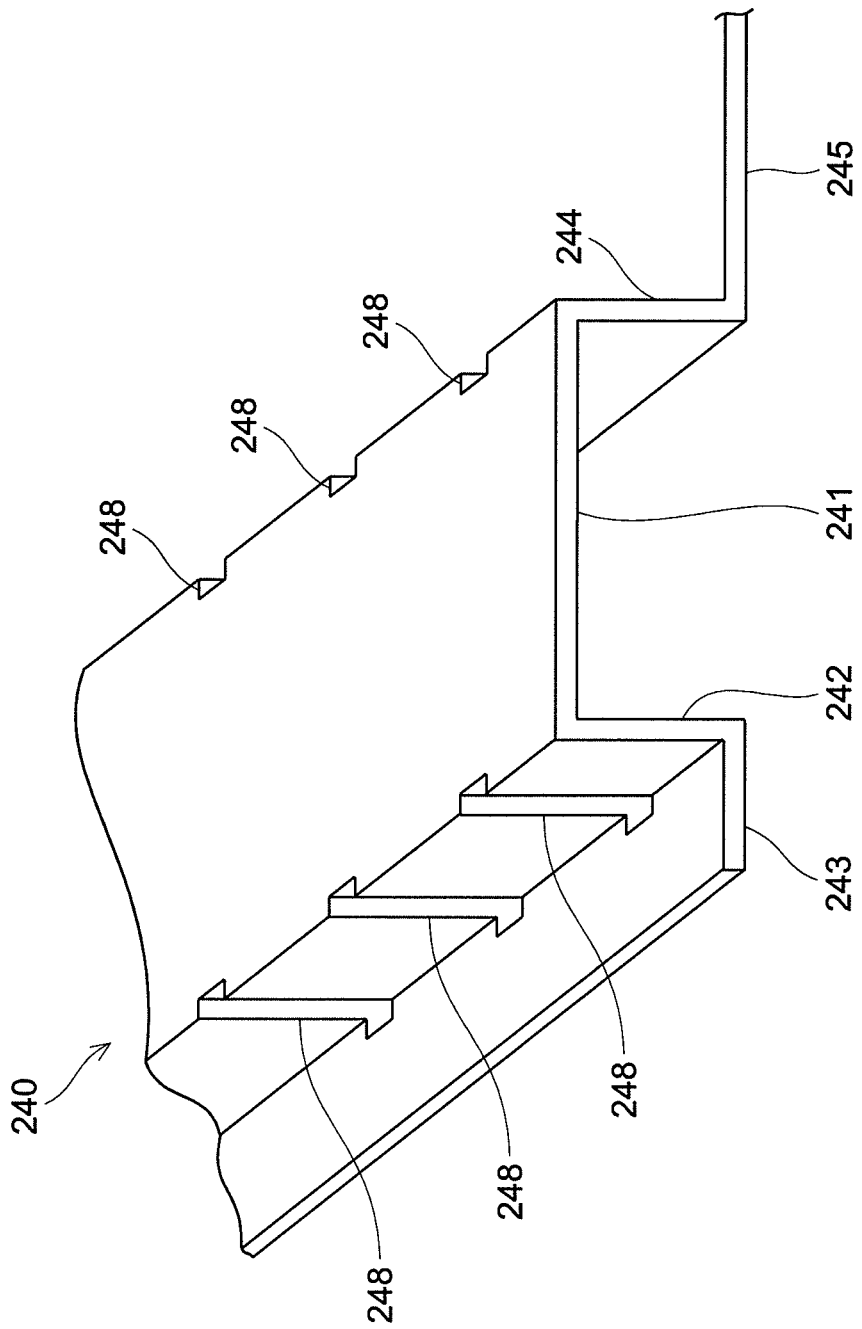
FIG. 6 is a perspective view of a main portion of an attachment plate according to a second embodiment of the present invention.

FIG. 6 is a perspective view of a main portion of an attachment plate according to a second embodiment of the present invention. Description is made of an attachment plate different from that in the first embodiment, and description of the same portions as those in the first embodiment is omitted in the following.

An attachment plate 240 includes a caster attachment portion 241, a first bent portion 242 formed by downward bending at a right angle of an outer edge in a side direction of the caster attachment portion 241 (direction of the arrows A-B of FIG. 3), and a first coupling portion 243 formed by outward bending at a right angle of a lower end portion of the first bent portion 242. The first coupling portion 243 is firmly attached to a pipe (support member) (not shown) with screws or by spot welding.

Further, the attachment plate 240 includes a second bent portion 244 formed by downward bending at a right angle of an inner edge in the side direction of the caster attachment portion 241 (direction of the arrows A-B of FIG. 3). A connecting portion 245 is formed on an inner edge in a side direction of the second bent portion 244. While not shown, similarly to the above description, another second bent portion 244, another caster attachment portion 241, and another first coupling portion 243 are formed on the other side of the connecting portion 245.

Further, the attachment plate 240 is formed of a steel plate and set to have a thickness enough to support the load of the apparatus main body 1a.

In this case, when the image forming apparatus 1 is relatively large and the load of the mounted apparatus main body 1a is large in accordance therewith, it is necessary to set the thickness of the attachment plate 240 to be large so as to be capable of bearing the load. As the thickness becomes larger, the elasticity of the first bent portion 242 and the second bent portion 244 becomes lower. Thus, when the force in the horizontal direction acts on the casters at the time of movement, the first bent portion 242 and the second bent portion 244 are less liable to be elastically deformed in the caster moving direction.

In this context, a plurality of cutout portions 248 are provided to each of the first bent portion 242 and the second bent portion 244 in advance. Each of the cutout portions 248 includes a groove extending in a vertical direction of the first bent portion 242 and the second bent portion 244, a groove formed in the caster attachment portion 241 continuously with the former groove, and grooves formed respectively in the first coupling portion 243 and the connecting portion 245 continuously with the first bent portion 242 and the second bent portion 244. With the provision of the cutout portions 248, the first bent portion 242 and the second bent portion 244 become higher in elasticity and are more easily deformed in accordance with the force in the horizontal direction. Thus, the impact on the casters 130 is reduced. The numbers of the plurality of cutout portions 248 and the width of the grooves may be appropriately changed in accordance with the load of the apparatus main body 1a.

(Third Embodiment)

Figure 7:
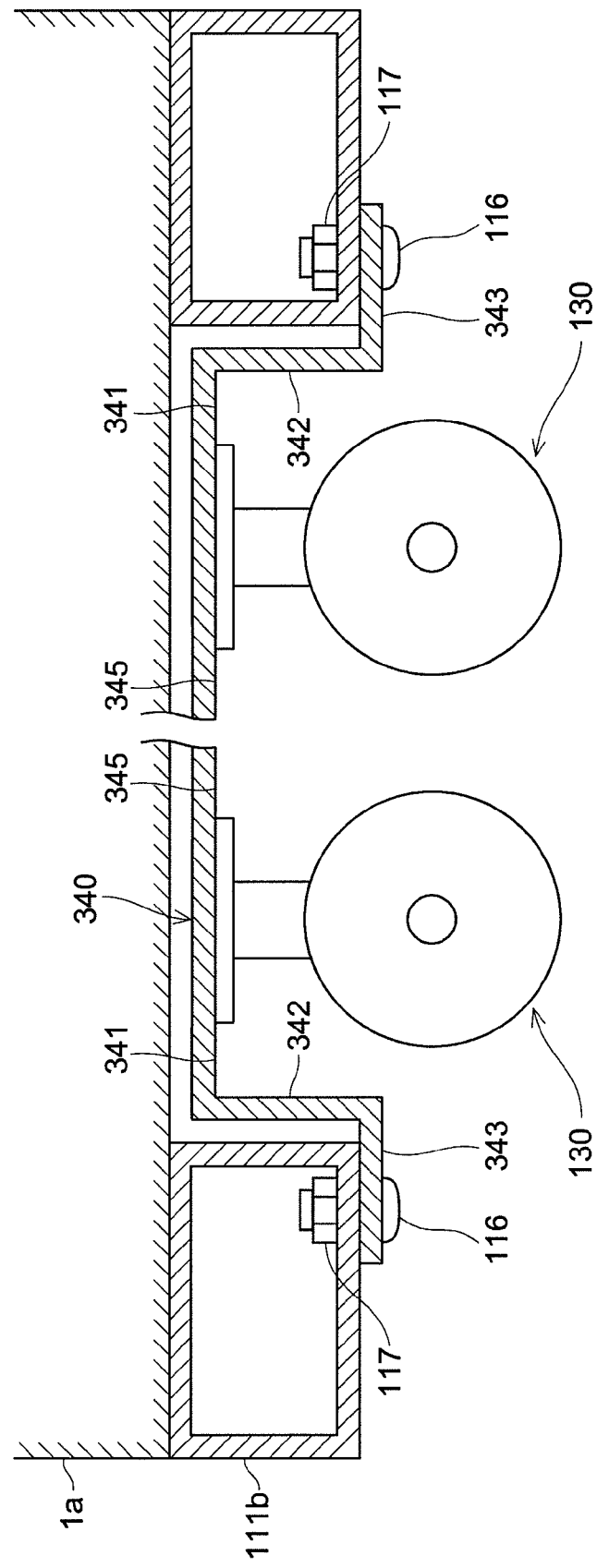
FIG. 7 is a schematic partial sectional view taken along a side direction of an attachment plate according to a third embodiment of the present invention.

FIG. 7 is a schematic partial sectional view taken along the side direction of an attachment plate according to a third embodiment of the present invention. The second bent portions are not provided in the third embodiment.

An attachment plate 340 includes the following provided on each end side thereof: a caster attachment portion 341, a first bent portion 342 formed by downward bending at a right angle of an outer edge in a side direction of the caster attachment portion 341 (direction of the arrows A-B of FIG. 3), and a first coupling portion 343 formed by outward bending at a right angle of a lower edge of the first bent portion 342. A connecting portion 345 is formed on an inner side of each of the caster attachment portions 341. The connecting portion 345 and the caster attachment portion 341 are formed on the same plane.

Each of the first coupling portions 343 is firmly attached to the lower surface of the pipe 111b with the screw 116 and the nut 117.

When the apparatus main body 1a is supported by the support member 110 (refer to FIG. 3) including the pipes 111b and the pipes 111a (refer to FIG. 3) and the apparatus main body 1a having remained stationary starts to be moved in the side direction (right direction of FIG. 7, for example), the force in the horizontal direction (left direction of FIG. 7, for example) is applied owing to counteraction to the caster 130 in proportion to the load of the apparatus main body 1a. The force in the horizontal direction causes the impact force to act on the caster 130, the impact force acting on the caster 130 being transmitted to the attachment plate 340. Each of the first bent portions 342 of the attachment plate 340 is bent at a predetermined angle (right angle in this case) with respect to the side direction. Thus, in accordance with the force in the horizontal direction, each of the first bent portions 342 is elastically deformed in the horizontal direction (left direction of FIG. 7, for example). The elastic deformation reduces the impact acting on the caster 130 at the time of starting movement. When the movement speed of the apparatus main body 1a becomes constant, each of the first bent portions 342 is restored to an original shape.

Accordingly, the apparatus main body 1a is allowed to be stably moved without breakage of the casters 130. Further, it is unnecessary to interpose coil springs or rubber blocks, and hence it is possible to suppress upsizing and increase in cost of the apparatus.

(Fourth Embodiment)

Figure 8:
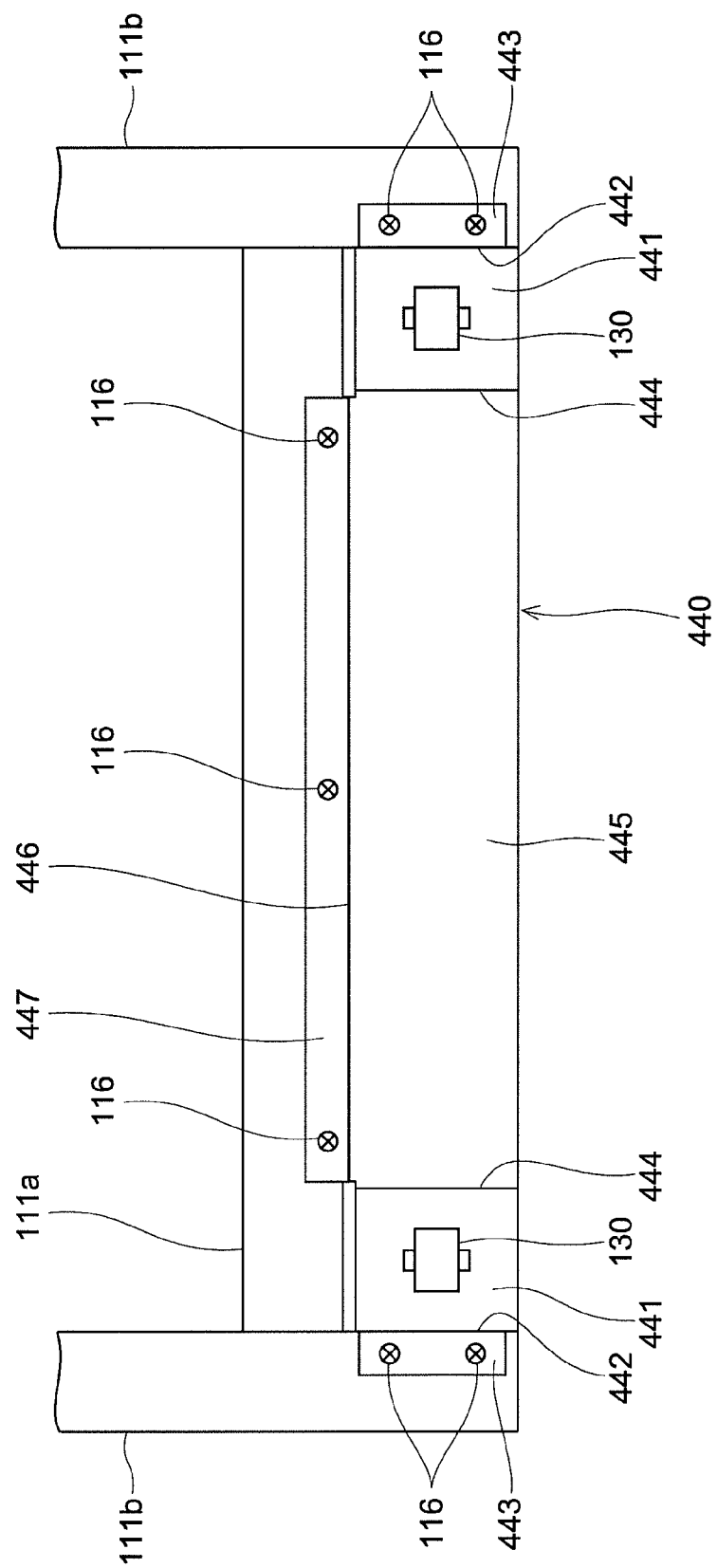
FIG. 8 is a plan view of an attachment plate according to a fourth embodiment of the present invention.

FIG. 8 is a plan view from a bottom surface side, illustrating an attachment plate according to a fourth embodiment of the present invention. The fourth embodiment is different from the embodiments hereinabove in the configuration of the third coupling portion.

An attachment plate 440 exhibits a rectangular shape and includes caster attachment portions 441 respectively provided on both end portion sides in a longer side direction thereof. The caster 130 is attached to each of the caster attachment portions 441.

Further, the attachment plate 440 includes first bent portions 442 formed by downward bending at a right angle (to a reader's side of FIG. 8) of outer edges in a side direction of the caster attachment portions 441 (right-and-left direction of FIG. 8), and first coupling portions 443 formed by outward bending at a right angle of lower edges of the first bent portions 442. In addition, the attachment plate 440 includes second bent portions 444 formed by downward bending at a right angle of inner edges in the side direction of the caster attachment portions 441. A connecting portion 445 is formed between the second bent portions 444.

In addition, the attachment plate 440 includes a third bent portion 446 formed by downward bending at a right angle of an inner edge in a direction orthogonal to the side direction of the connecting portion 445, and a third coupling portion 447 formed by inward bending at a right angle of a lower edge of the third bent portion 446. The third bent portion 446 is bent by the same amount as that of the first bent portions 442.

Each of the first coupling portions 443 is firmly attached to the lower surface of the pipe 111b with the two screws 116. Further, the third coupling portion 447 is firmly attached to the lower surface of the pipe 111a with the three screws 116.

As described above, in the fourth embodiment, the attachment plate 440 exhibits a rectangular shape and includes the first coupling portions 443 respectively provided on both the end portion sides on short sides (side direction) of the attachment plate 440 and firmly attached to the pipes 111b, and the third coupling portion 447 provided on the inner edge of the connecting portion 445 (direction orthogonal to the side direction) and firmly attached to the pipe 111a, the inner edge of the connecting portion 445 being on a longer side of the attachment plate 440.

With this configuration, when the apparatus main body 1a remains stationary, a perpendicular force resisting the load of the apparatus main body 1a is applied from the floor surface to the casters 130. However, the third coupling portion 447 of the attachment plate 440 and the caster attachment portions 441 to which the casters 130 are attached are separated from each other. In addition, the third coupling portion 447 is firmly attached to the pipe 111a, and outer sides of the connecting portion 445 and of the caster attachment portions 441 constitute a free end. Thus, in accordance with the perpendicular force from the floor surface, the connecting portion 445 and the caster attachment portions 441 are elastically deformed upward (side opposite to the reader's side of FIG. 8). The elastic deformation reduces the load applied to the casters 130.

Further, when the apparatus main body 1a having remained stationary starts to be moved in the side direction (right direction of FIG. 8, for example), the force in the horizontal direction (left direction of FIG. 8, for example) is applied owing to counteraction to the casters 130 in proportion to the load of the apparatus main body 1a. The force in the horizontal direction causes the impact force to act on the casters 130, the impact force acting on the casters 130 being transmitted to the attachment plate 440. Each of the first bent portion 442 and the second bent portion 444 of the attachment plate 440 is bent at predetermined angles (right angle in this case) with respect to the side direction. Thus, in accordance with the force in the horizontal direction, each of the first bent portions 442 is elastically deformed in the horizontal direction (left direction of FIG. 8, for example). In this context, the caster attachment portions 441 arranged between the first bent portion 442 and the second bent portion 444 are not restricted in the direction orthogonal to the side direction, and hence are more easily elastically deformed. The elastic deformation reduces the impact acting on the casters 130 at the time of starting movement.

Accordingly, without breakage of the casters 130, it is possible to reliably support the load of the apparatus main body 1a, and stably move the apparatus main body 1a while suppressing rocking thereof.

Note that, although the above-mentioned embodiments describe an example that the leg-portion attachment structure is adapted to an image forming apparatus, the present invention is not limited thereto. The leg-portion attachment structure may be adapted to main bodies of a sheet feeding apparatus for feeding sheets to a copier, an electric/electronic apparatus, a conveying apparatus, and the like.

Further, although the above-mentioned embodiments describe a configuration in which the third coupling portion of the attachment plate is formed by inward bending at a right angle of the edge of the third bent portion to be bent downward, the present invention is not limited thereto. The third coupling portion may be formed on the same plane as that on which the caster attachment portions are formed. Also in this case, as described above, even when being exposed to the perpendicular force, which resists the load of the apparatus main body and is applied from the floor surface, the attachment plate is elastically deformed upward. As a result, an advantage of reducing the load applied to the casters is obtained.

Still further, although the above-mentioned embodiments describe a configuration in which the first and second bent portions are formed by being bent downward, the present invention is not limited thereto. A configuration in which the first and second bent portions may be formed by being bent upward may be adopted. Also in this case, in accordance with the force in the horizontal direction, the first and second bent portions are elastically deformed in the caster moving direction. As a result, an advantage of reducing impact acting on the casters is obtained.

Yet further, although the above-mentioned embodiments describe a configuration in which the first bent portions are bent at right angles, the present invention is not limited thereto. A configuration in which the first bent portions may be bent at obtuse angles may be adopted. Also in this case, the advantages as described above are obtained.

The present invention is applicable to a leg-portion attachment structure for movably supporting to-be-mounted main bodies of an image forming apparatus, an electric/electronic apparatus, and the like, and an image forming apparatus provided with the leg-portion attachment structure.

What is claimed is:

1. A leg-portion attachment structure for movably supporting a main body of an apparatus, said structure comprising:
    a plurality of casters movable on a floor surface;
    a metal support member having a substantially quadrilateral outer periphery and an upper surface on which the main body is mounted; and
    a metal attachment plate provided at least at one of two opposite sides on a lower surface of the support member so as to form a first gap between the main body and the attachment plate, the attachment plate including
        a caster attachment portion formed on two end sides in a side direction so that one of the plurality of casters is firmly attached,
        a first elastically deformable bent portion formed by bending of an outer edge in the side direction of the caster attachment portion at a predetermined angle,
        a first coupling portion that is formed by further outward bending of an edge of the first bent portion and is firmly attached to the support member,
        a second elastically deformable. bent portion formed by bending of an inner edge in the side direction of the caster attachment portion at a predetermined angle, and
        a connecting portion formed between two of the second bent portions to have, in a direction orthogonal to the side direction, a free end free from being firmly attached to the support member,
    wherein a second gap is provided between the first elastically deformable bent portion and the support member.

2. A leg-portion attachment structure according to claim 1, wherein the first elastically deformable bent portion and the second elastically deformable bent portion are respectively formed by bending of edges of the caster attachment portion toward the floor surface.

3. A leg-portion attachment structure according to claim 2, wherein the second elastically deformable bent portion is formed by being bent at an obtuse angle with respect to the caster attachment portion.

4. A leg-portion attachment structure according to claim 2, wherein the first elastically deformable bent portion is formed by being bent at a right angle with respect to the caster attachment portion.

5. A leg-portion attachment structure according to claim 1, wherein the attachment plate comprises
    a third bent portion. formed by bending of an inner edge in a direction orthogonal to the side direction of the caster attachment portion at a predetermined angle, and
    a third coupling portion that is formed by further inward bending of an edge of the third bent portion and is firmly attached to the support member; and wherein
    an outer edge in the direction orthogonal to the side direction of the caster attachment portion constitutes the free end.

6. A leg-portion attachment structure according to claim 5, wherein the third bent portion is formed by being bent by the same amount as that of the first bent portion.

7. A leg-portion attachment structure according to claim 1, wherein:
    the support member comprises
        four pipe members attached so that four sides of a quadrangle are formed, and
        a flat plate firmly attached to the four pipe members; and
    the attachment plate is firmly attached to the four pipe members.

8. A leg-portion attachment structure according to claim 1, wherein the attachment plate is formed of an elastic steel.

9. A leg-portion attachment structure according to claim 8, wherein the first elastically deformable bent portion of the attachment plate is provided with a groove extending in a vertical direction.

10. A leg-portion attachment structure according to claim 8, wherein the second elastically deformable bent portion of the attachment plate is provided with a groove extending in a vertical direction.

11. A leg-portion attachment structure according to claim 1, wherein the attachment plate comprises
    a connecting portion formed between the second elastically deformable bent portions,
    a third bent portion formed by bending of an inner edge in a direction orthogonal to a side direction of the connecting portion, and
    a third coupling portion that is formed by further inward bending of an edge of the third bent portion and is firmly attached to the support member.

12. A leg-portion attachment structure according to claim 11, wherein an outer edge in the direction orthogonal to the side direction of the connecting portion constitutes the free end.

13. An image forming apparatus mounted to the leg-portion attachment structure according to claim 1.

* * * * *